3,330,881
COLOR IMPROVEMENT OF WAX OLEFINS
Francis J. Higgins, Ponca City, Okla., assignor to Continental Oil Company, Ponca City, Okla., a corporation of Delaware
No Drawing. Filed Aug. 17, 1964, Ser. No. 390,175
10 Claims. (Cl. 260—677)

This invention relates to wax olefins and more particularly to a process for improving the color of wax olefins.

One of the procedures now used to produce normal olefins involves halogenation of a straight chain paraffin having about 18–30 carbon atoms, and then dehydrohalogenating the haloalkane to obtain an olefin having essentially the same number of carbon atoms and configuration as the paraffin charge.

The halogenation and dehydrohalogenation operations are not clean cut. Side reaction products are produced. Some of these side reaction products are very highly colored and its is normal for these raw wax olefins to have a color ranging from brown to black. Also, the color bodies are thermally unstable and get darker when heated. The color bodies carry over to alkylates and other products made from the olefin, unless steps are taken to remove the color bodies. One procedure for removing these color bodies is to percolate the raw wax olefins through a solid adsorbent, such as, charcoal or fuller's earth. Percolation is expensive, troublesome and results in a considerable loss of olefins.

The principal object of the invention is a process for improving the color of raw wax olefins.

Other objects of the invention will become evident in the course of the detailed description thereof.

Briefly, the process of the invention comprises intimately contacting a wax olefin and ketone solvent having 1–2 carbon atoms in each alkyl group, in an amount and at a temperature such that two separate liquid phases are obtained, wherein said wax olefin is the product of dehydrohalogenating a halo-n-alkane having about 18–30 carbon atoms; and separating a ketone phase, the olefin content thereof being of substantially improved color, from a color body phase.

The raw wax olefin charge to the process of the invention is to be understood as an olefin or mixture of olefins, which are the product of dehydrohalogenating halo-n-alkane having about 18–30 carbon atoms. Any halo-n-alkane may be used as the charge to the dehydrohalogenation operation, but it is customary to utilize chloro-n-alkanes. A particularly suitable mixture of raw wax olefins has predominantly about 20–25 carbon atoms. It is to be understood that the raw wax olefins charge includes not only the material as produced in the dehydrohalogenation process, but also materials which have been distilled to produce a particular boiling range of olefins, or which have been given a preliminary decolorization treatment, which treatment is not sufficient to produce the desired final color. The process of the invention is particularly effective with wax olefins as produced in the dehydrohalogenation operation.

The process of the invention may be described as a liquid-liquid extraction operation as the wax olefin is intimately contacted with a ketone solvent under conditions such that two separate liquid phases are obtained. The ketone solvent includes dialkyl ketone having 1–2 carbon atoms in each alkyl group, i.e., acetone, methyl-ethyl ketone, and diethyl ketone. The ketone solvent may include water; the presence of water in the solvent is particularly effective with the ethyl ketones. The amount of water will be dependent upon the character of the wax olefin charge, the particular ketone, and temperature of operation. In general with methyl-ethyl ketone the water usage is about 1–10 volume percent.

Sufficient ketone solvent is present to produce two separate liquid phases at the particular temperature of operation. In general, the solvent is present in an amount of about 2–40 volumes of solvent per volume of wax olefin charge. It is pointed out that too little ketone solvent or too much ketone solvent will result in a single phase system. In the case of acetone solvent the amount of acetone solvent to wax olefin charge commonly is between about 2:1 and 20:1.

The liquid-liquid contacting is carried out at a temperature which will result in the production of two separate liquid phases at the particular ketone solvent usage. In general, the process is carried out at a temperature between about 50° and 90° F., and more usually the ordinary ambient temperatures of about 60°–80° F.

After the intimate contacting of the wax olefin charge and the ketone solvent, the two liquid phases produced are separated by conventional procedures which include gravity settling and centrifugal separation. The ketone phase contains the wax olefin product and the olefin content of this phase is of substantially improved color relative to the color of the raw wax olefin charge. The wax olefin product may be readily separated from the ketone solvent by distillation of the ketone.

The other liquid phase includes the color bodies rejected by the ketone solvent. This phase includes color bodies, some olefin, some ketone solvent and other hydrocarbons present in the raw wax olefin charge. Generally this color body phase is processed to recover ketone solvent.

ILLUSTRATIONS

The process of the invention is illustrated by the treatment of two mixtures of raw wax olefins. Wax olefin mixture A and B included olefin having 20–25 carbon atoms with a small amount of lower carbon number and higher carbon number olefins. These wax olefins had been prepared by chlorinating straight chain paraffin (sweat wax) to a chlorine content of about one atom per molecule of paraffin. The chloroparaffins were then dehydrochlorinated, in the presence of lime, to obtain the raw wax olefin.

The liquid-liquid extraction operation was carried out using a separatory funnel agitator and separator. The contacting was carried out at laboratory temperature of 76° F. The ketone phase was distilled to recover the wax olefin content. The color of the wax olefin charge and of the wax olefin product was determined using a Klett Colorimeter.

The raw wax olefin mixture A was a dark brown color; the wax olefin product of Example 2 below was a light tan color. The color of wax olefin mixture B was brown, and the wax olefin product was in general a straw color.

Example 1

5 ml. of wax olefin B, +50 ml. of acetone at 76° F.— two phases, added 10 ml. increments of acetone to a total of 100 ml., 20:1 ratio. Two phases continued to form but the darker phase became smaller with additional acetone.

The mixture was centrifuged, separated and solvent removed. An estimated 95% yield of improved color olefins was obtained.

Klett Colorimeter colors were:
 Original olefins _____ 640
 Product olefins _____ 155

This represents 24.2% of the original color.

Example 2

5 ml. of another, darker wax olefin, plus a total of 110 ml. of acetone at 76° F. The mixture was centrifuged, separated and freed from solvent. A yield of about 95% was estimated.

Colorimeter readings were:

| | |
|---|---|
| Original wax olefin A, color | 1400 |
| Product olefins, color | 375 |

This represents 26.8% of the original color.

Example 3

5 ml. wax olefin B, 25 ml. acetone—two layers at 76° F. Heated to 122° F. and the mixture became completely miscible and clear. Upon cooling to room temperature, dark color bodies settled to the bottom as before.

Example 4

Acetone was added incrementally to 5 ml. of wax olefin B. When a total of 220 ml. was added, 44:1 ratio, only a hazy mixture was obtained. Upon standing, however, a small quantity of dark color bodies settled to the bottom. When warmed to 90° F. all color bodies dissolved. A return to room temperature again produced the small quantity of color bodies at the bottom.

Example 5

| | |
|---|---|
| Wax olefin B, 5 mil. | |
| MEK, 50 ml. | Miscible at 76° F. |
| +½ mil. water | Miscible at 76° F. |
| +½ mil. water | Hazy. |
| +½ mil. water | Cloudy. |
| +½ mil. water | Cloudy. |
| +½ mil. water | More cloud, some settling. |
| +½ mil. water | Dark phase definitely came to the bottom. |

Centrifuged and obtained ½ ml. of water, 1 ml. of dark brown bottom layer. Separated the two layers, removed solvent and found the following colors.

| | |
|---|---|
| Original wax olefin, color | 640 |
| Production olefins, color | 130 |

This represents 20.3% of the original color.

Example 6

5 ml. wax olefin A, added up to 25 ml. of MIBK—miscible at 76° F., cooled to 37° F.—miscible. Added 1 ml. of water which produced a haze but upon settling the bottom layer was water. No color separation occurred.

Thus having described the invention, what is claimed is:

1. A process for improving the color of "raw wax olefins" which process comprises:
   (a) intimately contacting in the liquid state a wax olefin and ketone solvent having 1–2 carbon atoms in each alkyl group, in an amount and at a temperature in the range 50° to 90° F. such that two separate liquid phases are obtained, wherein said wax olefin is the product of dehydrohalogenating a halo-n-alkane having about 18–30 carbon atoms;
   (b) separating a ketone phase, the olefin content thereof being of substantially improved color, from a color body phase; and
   (c) separating the ketone from the olefin in said ketone phase by distillation.

2. The process of claim 1 wherein said wax olefin is a mixture predominating in 20–25 carbon atom olefins.

3. The process of claim 1 wherein said ketone solvent includes water.

4. The process of claim 1 wherein said ketone is acetone.

5. The process of claim 1 wherein said ketone is methyl-ethyl ketone.

6. The process of claim 1 wherein said solvent is present in an amount of about 2–40 volumes per volume of said wax olefin.

7. The process of claim 1 wherein said temperature is between about 60° and 80° F.

8. A process for improving the color of "raw wax olefins" which process comprises:
   (a) intimately contacting in the liquid state a wax olefin and acetone solvent in an amount of about 2–40 volumes of solvent per volume of olefin, at a temperature in the range 50° to 90° F. such that two separate liquid phases are obtained, wherein said wax olefin is the product of dehalohydrogenating a chloro-n-alkane mixture having predominately 20–25 carbon atoms;
   (b) separating an acetone phase, the olefin content thereof being of substantially improved color, from a color body phase; and
   (c) separating the acetone from the olefin in said acetone phase by distillation.

9. The process of claim 8 wherein said amount is between about 2:1 and 20:1.

10. The process of claim 8 wherein said temperature is about 60°–80° F.

References Cited

UNITED STATES PATENTS

| | | | |
|---|---|---|---|
| 2,082,204 | 6/1937 | Gardiner et al. | 208—27 |
| 2,168,330 | 8/1939 | Ferris | 208—24 |
| 2,647,934 | 10/1953 | Hillyer | 260—677 |
| 3,070,636 | 12/1962 | Kieras | 208—24 |

OTHER REFERENCES

H. Bennet: "Commercial Waxes," 1944 (p. 32) and (p. 37).

ALEXANDER H. BRODMERKEL, *Primary Examiner.*

DANIEL ARNOLD, *Examiner.*

T. MORRIS, *Assistant Examiner.*